(12) United States Patent
Knoll et al.

(10) Patent No.: US 7,452,028 B2
(45) Date of Patent: *Nov. 18, 2008

(54) MODULAR COMFORT ASSEMBLY FOR OCCUPANT SUPPORT

(75) Inventors: Peter R. Knoll, La Salle (CA); Benson J. Brady, Windsor (CA); Michael J. Bevan, Amherstburg (CA)

(73) Assignee: IGB Automotive Ltd., Windsor (CA)

( * ) Notice: Subject to any disclaimer, the term of this patent is extended or adjusted under 35 U.S.C. 154(b) by 249 days.

This patent is subject to a terminal disclaimer.

(21) Appl. No.: 11/003,554

(22) Filed: Dec. 3, 2004

(65) Prior Publication Data

US 2006/0138810 A1 Jun. 29, 2006

(51) Int. Cl.
*A47C 31/00* (2006.01)
(52) U.S. Cl. .............................. 297/180.1; 297/180.12; 297/180.13; 297/180.14; 297/284.4
(58) Field of Classification Search .............. 297/180.1, 297/180.12, 180.13, 180.14, 284.4, 284.14; 219/217; 5/421; 454/120
See application file for complete search history.

(56) References Cited

U.S. PATENT DOCUMENTS

| | | | | |
|---|---|---|---|---|
| 5,927,817 A | * | 7/1999 | Ekman et al. | 297/452.47 |
| 6,273,810 B1 | * | 8/2001 | Rhodes et al. | 454/120 |
| 6,629,725 B1 | * | 10/2003 | Kunkel et al. | 297/180.12 |
| 6,722,148 B2 | * | 4/2004 | Aoki et al. | 62/244 |
| 6,808,230 B2 | * | 10/2004 | Buss et al. | 297/180.12 |
| 6,893,086 B2 | * | 5/2005 | Bajic et al. | 297/180.14 |
| 6,988,770 B2 | * | 1/2006 | Witchie | 297/180.14 |
| 7,040,710 B2 | * | 5/2006 | White et al. | 297/452.46 |
| 7,108,319 B2 | * | 9/2006 | Hartwich et al. | 297/180.1 |
| 7,134,715 B1 | * | 11/2006 | Fristedt et al. | 297/180.12 |
| 7,168,758 B2 | * | 1/2007 | Bevan et al. | 297/180.13 |
| 2003/0125650 A1 | * | 7/2003 | Grosso | 602/13 |

FOREIGN PATENT DOCUMENTS

DE 3513909 * 10/1986
EP 0280213 * 2/1988

* cited by examiner

*Primary Examiner*—Laurie K Cranmer
(74) *Attorney, Agent, or Firm*—Fildes & Outland, P.C.

(57) ABSTRACT

A modular comfort assembly is disclosed. The modular comfort assembly is adapted for installation within an occupant support. The occupant support includes a surface, which has a recess therein. The modular comfort assembly includes a ventilation diffuser allowing for flow of air through the diffuser. The diffuser has an outer edge sized to extend over and cover a perimeter of the recess. The modular comfort assembly also has a heating element adapted for placement on a surface of the diffuser.

10 Claims, 12 Drawing Sheets

MODULAR COMFORT ASSEMBLY FOR OCCUPANT SUPPORT

TECHNICAL FIELD

This invention relates generally to the field of comfort systems for occupant supports and more particularly to heating, venting and lumbar support systems for vehicle seating.

BACKGROUND OF THE INVENTION

It is known in the art relating to automotive seating comfort systems to install stand-alone heating, venting and/or lumbar systems within the seat as separate units. Such individual application of more than one comfort system into a seat can be difficult and time consuming.

Further, it is known in the art relating to automotive seating comfort systems to heat the seat by moving air over a heating element to warm the moving air and to subsequently heat the seat surface. This is inefficient as there may be heat loss in the moving air.

Furthermore, it is known in the art relating to automotive seating comfort systems to condition the air that passes through the ventilation system to cool the vehicle seat. This is also inefficient because it requires the use of a separate air conditioner in the comfort system. The air conditioning unit itself makes the comfort system costlier to manufacture and the use of the unit, once installed, requires a high input of energy.

SUMMARY OF THE INVENTION

The present invention provides a modular comfort assembly adapted for installation within an occupant support. The occupant support typically includes a fabric cover/seating surface covering a foam bun. The foam bun has an adjoining surface, which includes a recess therein. The comfort assembly includes a ventilation diffuser allowing for flow of air through the diffuser. The diffuser has an outer edge sized to extend over and cover a perimeter of the recess. The comfort assembly also includes a heating element adapted for placement on a surface of the diffuser.

In an exemplary embodiment of the modular comfort assembly, the ventilation diffuser is a sheet including a plurality of spaced apertures surrounded by a non-perforated peripheral portion. Additionally, an air permeable spacer material allowing for an even flow of air therethrough may be disposed in the recess between the occupant support and the diffuser sheet.

In an alternative exemplary embodiment of the modular comfort assembly, the ventilation diffuser includes a three-dimensional diffuser bag. The diffuser bag has a top perforated surface including a non-perforated peripheral portion adapted to extend over the perimeter of the recess. A bottom surface of the bag is adapted to lay in the recess, and a sidewall of the bag extends between the top and bottom surfaces. An air permeable spacer material is disposed in the diffuser bag. Additionally, the bottom surface of the diffuser bag may include perforations allowing for air flow through the bottom of the diffuser.

Optionally, in either embodiment, the heating element may include a single layer of permeable material and a heating wire formed in a predetermined pattern disposed about the layer of permeable material. Alternatively, the heating element may include a top layer of permeable material, a bottom layer of permeable material adapted for placement on a top surface of the diffuser, and a heating wire formed in a predetermined pattern disposed between the top and bottom layers. The permeable material may be felt or similar, or spacer fabric such as that supplied by Miller Textile of Germany.

Further, the modular comfort assembly may include a lumbar support system adapted for placement on a surface of the diffuser opposing the diffuser surface upon which the heating element is placed. The lumbar support system may include internal baffles and an air pump may be connected to an air inlet of the lumbar support system to allow for inflation and deflation of the lumbar support system.

The modular comfort assembly may also include an air moving device in communication with the diffuser for circulating air through the diffuser to provide a convection cooling effect. Further, the modular comfort assembly may include a control system. The control system may include a heat sensor for sensing temperature indicative of heat output from the heating element and a cooling sensor for sensing temperature indicative of convection cooling output from the air moving device. The control system further may include a processor for receiving heat sensor and cooling sensor signals. The processor simultaneously controls the heating element and air moving device to provide a predetermined occupant support temperature within the occupant support. The control system may also include an occupant support temperature sensor for sensing the occupant support temperature.

A method of installing a modular comfort assembly within an occupant support having a surface including a recess therein includes the steps of forming a sub-assembly including a ventilation diffuser having an outer edge sized to extend over and cover a perimeter of said recess, and a heating element adjacent a surface of said diffuser; and mounting the sub-assembly in the recess such that the diffuser outer edge seals the perimeter of the recess.

Optionally, the method may include the steps of providing an air permeable spacer material allowing for an even flow of air therethrough and disposing the spacer material in the recess between the occupant support and the diffuser. The method may also include the steps of forming through holes in the occupant support such that the through holes extend from the recess to a surface of the occupant support opposite the recess; and providing an air moving device in communication with the diffuser via the through holes for circulating air through the diffuser to provide a convection cooling effect.

Alternatively, a method of installing a modular comfort assembly within an occupant support having a surface including a recess therein includes the steps of forming a sub-assembly including: a three-dimensional diffuser bag including a top perforated surface having a non-perforated portion adapted to extend over the perimeter of the recess, a bottom surface adapted to lay in the recess, and a sidewall extending between the top and bottom surfaces; and a heating element adjacent a surface of said diffuser bag; disposing an air permeable spacer material within the diffuser bag; and mounting the sub-assembly in the recess. Optionally, the method may also include the step of placing a lumbar support system on a surface of the diffuser opposing the diffuser surface upon which the heating element is placed.

These and other features and advantages of the invention will be more fully understood from the following detailed description of the invention taken together with the accompanying drawings.

DETAILED DESCRIPTION OF THE INVENTION

Figure 1:
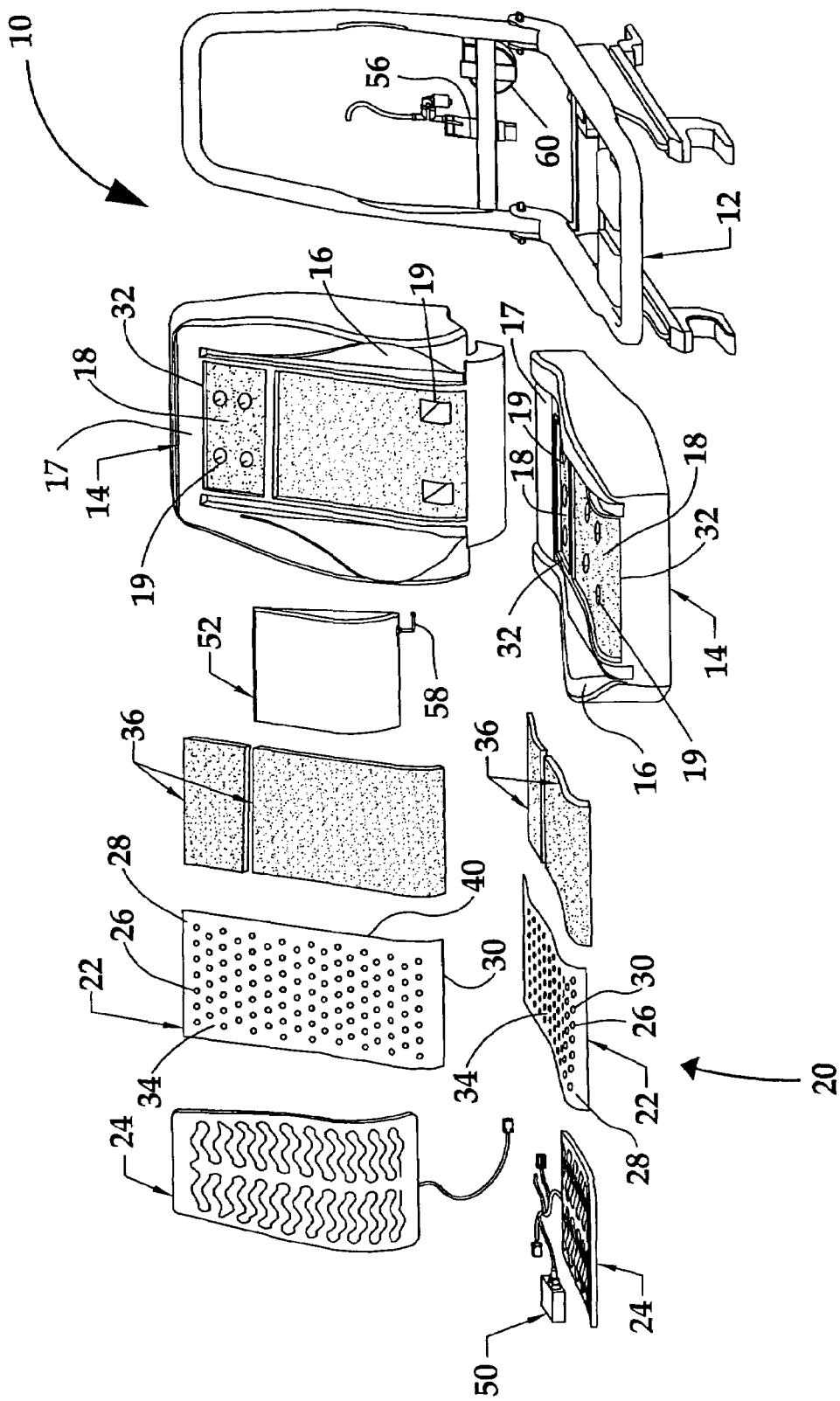
FIG. 1 is an exploded environmental perspective view of an occupant support and a modular comfort assembly in accordance with the present invention adapted for installation within the occupant support.

Referring now to the drawings in detail, numeral 10 generally indicates an occupant support such as a vehicle seating assembly including a seating frame 12, interior seating cushions, for example foam buns 14, and a fabric cover 16. In accordance with the present invention, a modular comfort assembly 20 is adapted for installation within one or more of the foam buns 14 have a surface 17 including a recess 18 therein to provide inexpensive temperature control of the occupant support 10. The foam buns 14 may also include through holes 19.

Figure 2:
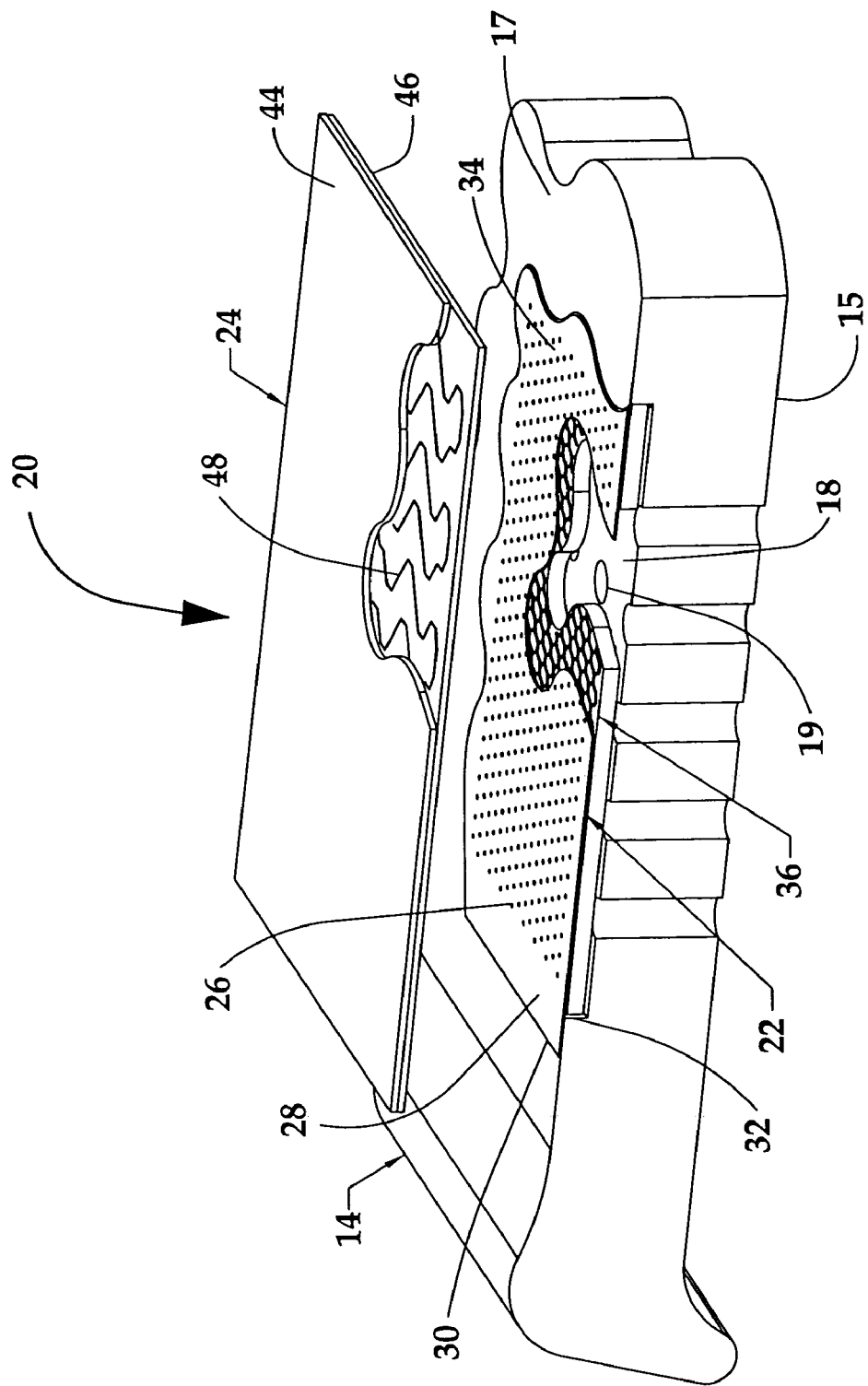
FIG. 2 is an exploded cutaway sectional view of the modular comfort assembly of FIG. 1 illustrating installation within the occupant support.
Figure 3:
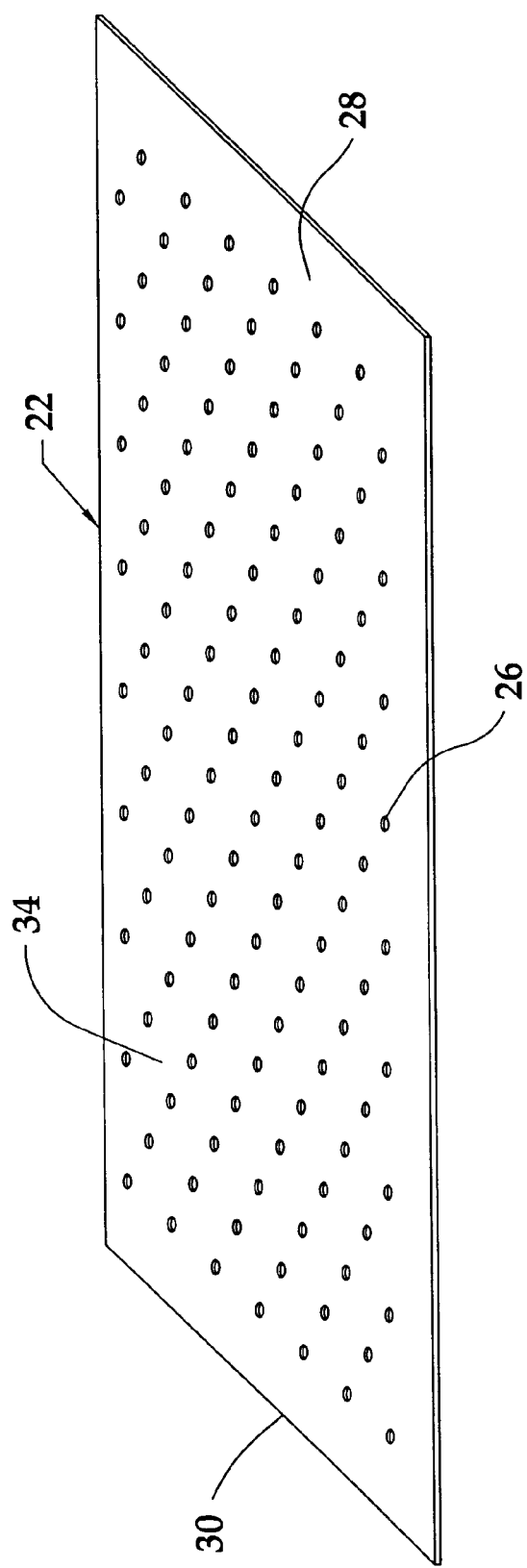
FIG. 3 is a perspective view of a diffuser sheet of the modular comfort assembly of FIG. 1.

FIGS. 1 through 3 illustrate an embodiment of the present invention wherein the modular comfort assembly 20 includes a ventilation diffuser 22 and a heating element 24. The ventilation diffuser 22 is a sheet including a plurality of spaced apertures 26 surrounded by a non-perforated peripheral portion 28. The diffuser sheet 22 allows for flow of air through the diffuser and has an outer edge 30 sized to extend over and cover a perimeter 32 of the recess 18. The diffuser sheet 22 may be made of a flexible material, such as latex or similar. The heating element 24 is adapted for placement on a surface 34 of the diffuser 22. An air permeable spacer material 36 may be disposed in the recess 18, between the foam bun 14 of the occupant support 10 and the diffuser sheet 22.

Figure 4:
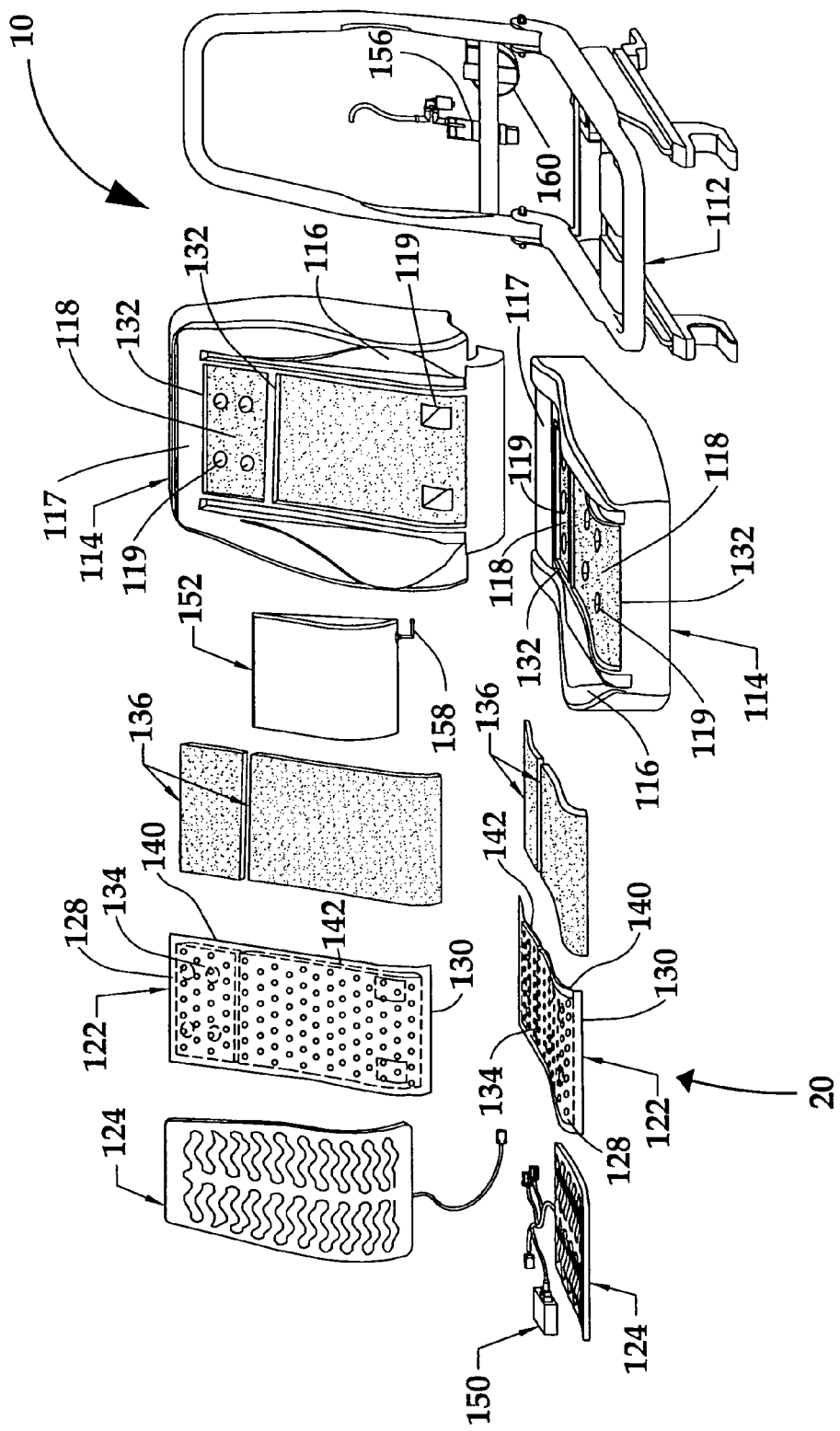
FIG. 4 is an exploded environmental perspective view of an occupant support and an alternative embodiment of a modular comfort assembly in accordance with the present invention adapted for installation within the occupant support.
Figure 5:
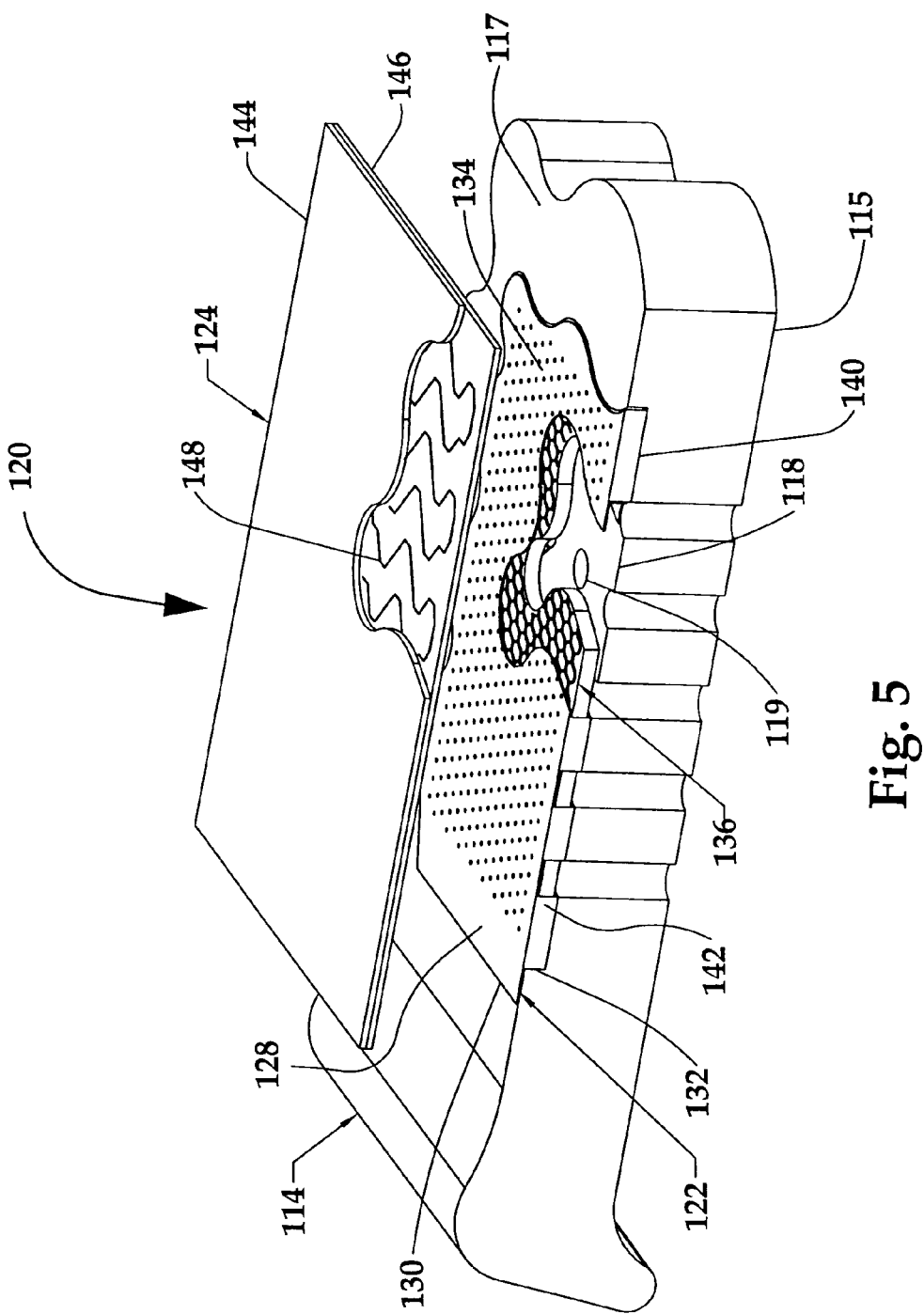
FIG. 5 is an exploded cutaway sectional view of the modular comfort assembly of FIG. 4 illustrating installation within the occupant support.
Figure 6:
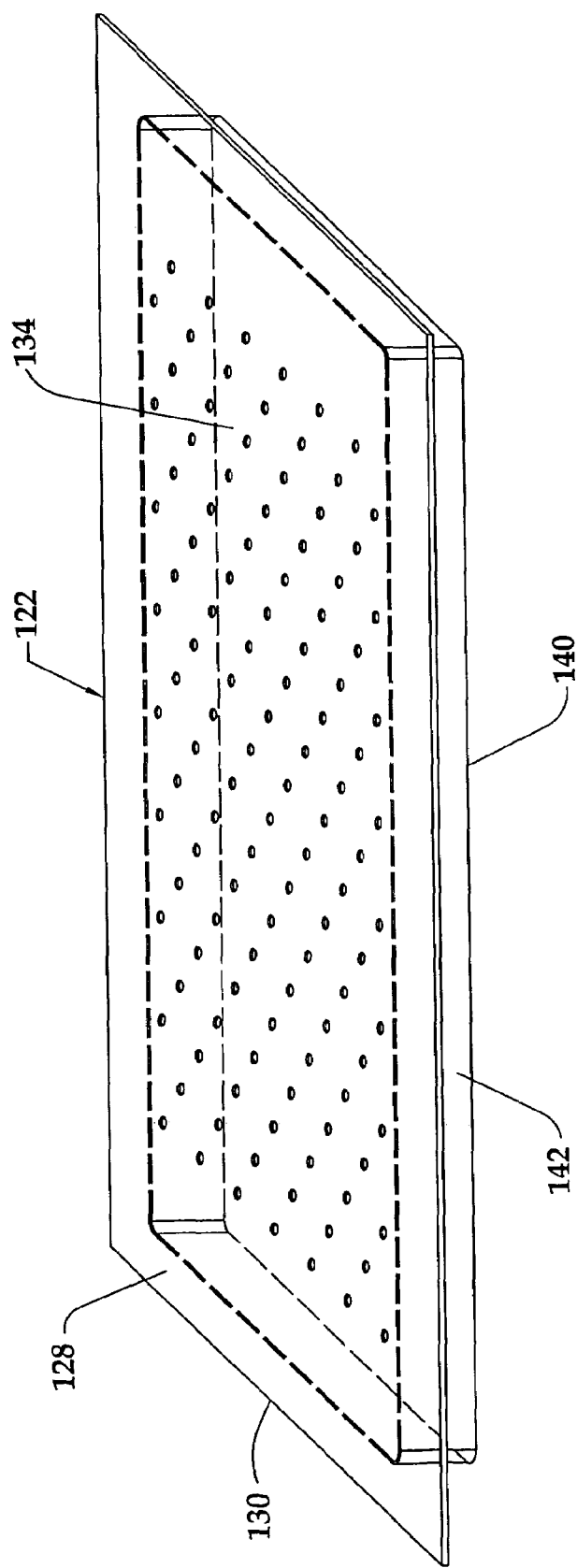
FIG. 6 is a perspective view of a diffuser bag of the modular comfort assembly of FIG. 4.

FIGS. 4 through 6 illustrate an alternative embodiment of the present invention. The modular comfort assembly 120 includes a ventilation diffuser 122 and a heating element 124. The diffuser 122 allows for flow of air therethrough and has an outer edge 130 sized to extend over and cover a perimeter 132 of the recess 118. In this embodiment, the ventilation diffuser 122 is a three-dimensional diffuser bag including a top perforated surface 134 having a non-perforated peripheral portion 128 adapted to extend over the perimeter 132 of the recess 118, a bottom surface 140 adapted to lay in the recess 118, and a sidewall 142 extending between the top 134 and bottom 140 surfaces. The diffuser bag 122 may be made of a flexible material, such as latex or similar. The three-dimensional diffuser bag 122 also includes an air permeable spacer material 136 disposed in the diffuser bag 122. The spacer material 136 facilitates the even distribution of air flow through the diffuser bag 122. The diffuser bag bottom surface 140 may include perforations allowing for air flow through the bottom of the diffuser 122. The heating element 124 is adapted for placement on the top surface 134 of the diffuser 122.

Figure 7:
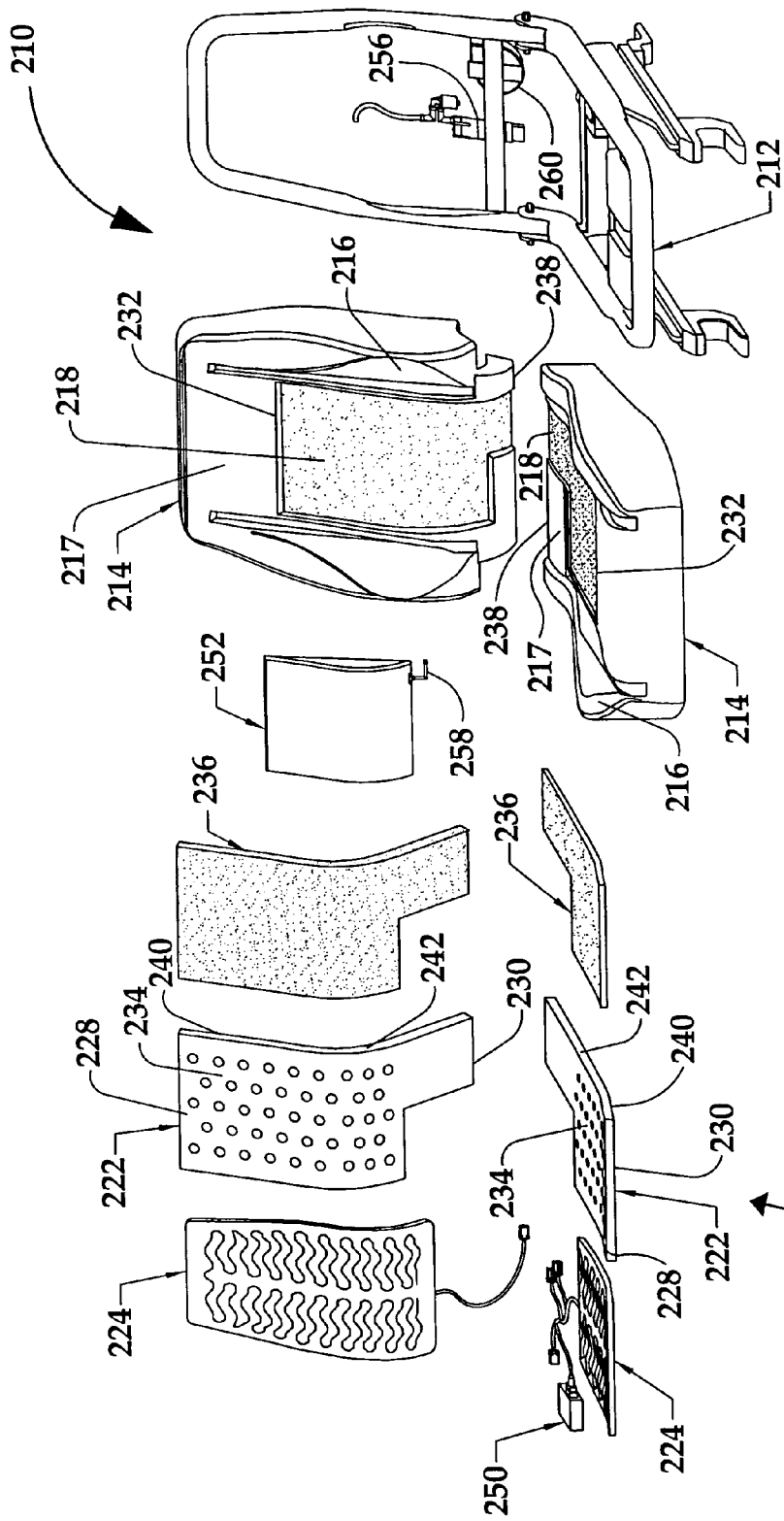
FIG. 7 is an exploded environmental perspective view of an occupant support and a third embodiment of a modular comfort assembly in accordance with the present invention adapted for installation within the occupant support.
Figure 8:
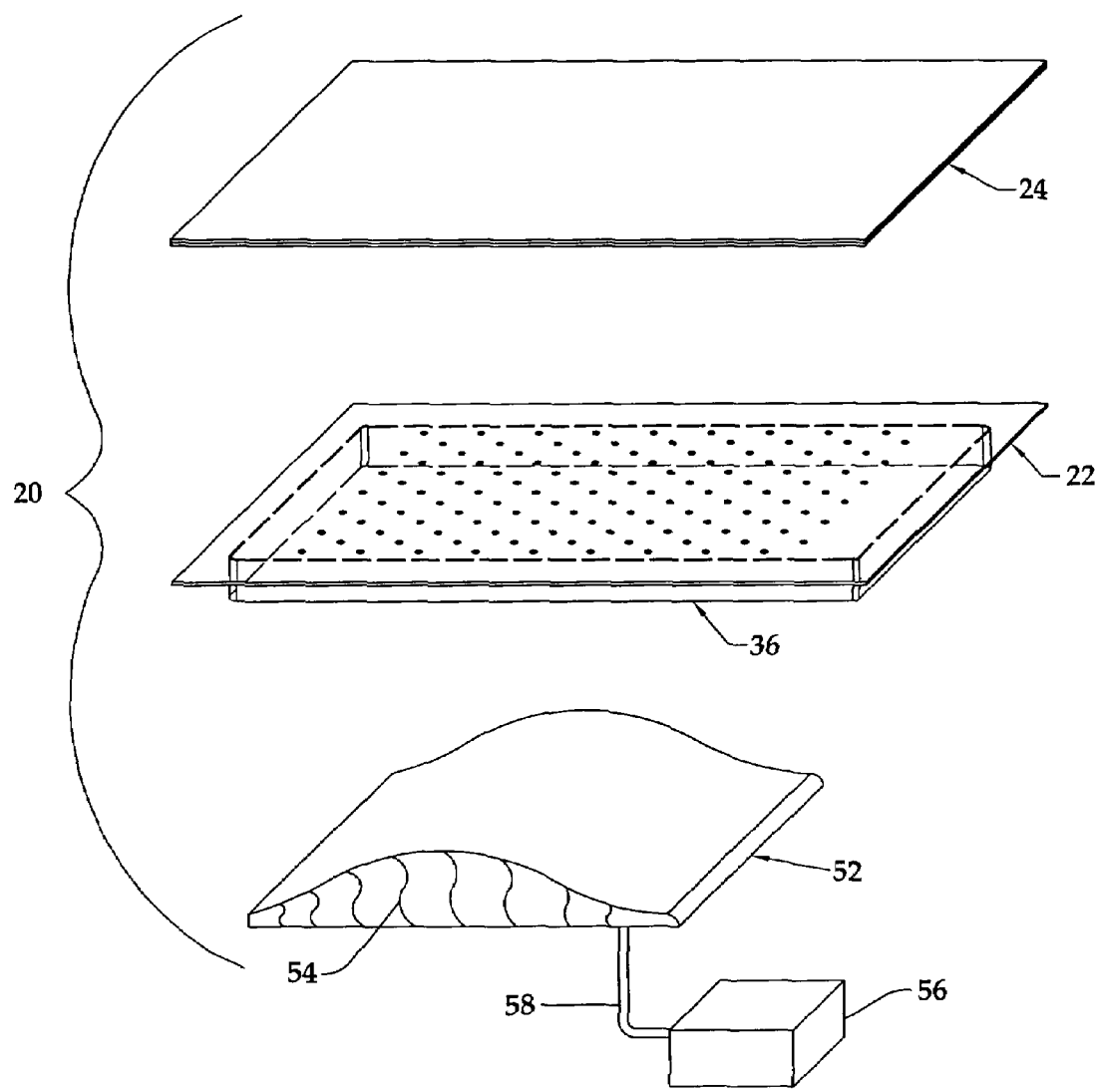
FIG. 8 is an exploded view of an embodiment of the modular comfort assembly in accordance with the present invention including a lumbar support system.

FIG. 7 illustrates a third embodiment of a modular comfort assembly 220 in accordance with the present invention. In this embodiment, which is similar to the second embodiment, the three-dimensional diffuser bag 222 and corresponding recess 218 are shaped such that air may be blow into the diffuser bag 222 from an edge 238 of the foam bun 214. Further description of the present invention, however, will be limited to a discussion of the first and second embodiments 20, 120.

Optionally, in either embodiment, the heating element 24, 124 may include a top layer 44, 144 of permeable material, a bottom layer 46, 146 of permeable material adapted for placement on a top surface 34, 134 of the diffuser 22, 122, and a heating wire 48, 148 formed in a predetermined pattern disposed between the top 44, 144 and bottom 46, 146 layers. Alternatively, the heating element 24, 124 may include a single layer of permeable material and a heating wire formed in a predetermined pattern disposed about the layer of permeable material. The layers of permeable material may be a flexible spacer material such as felt or similar, or spacer fabric such as that supplied by Miller Textile of Germany, and may be softer than the spacer material 36, 136. The top 44, 144 and bottom 46, 146 layers may be assembled together to secure the heating wire 48, 148 therebetween through the use of adhesive, double coated tape, hot melt glue, or similar. A wiring harness 50, 150 may also be electrically connected to the heating wire 48, 148 to provide an electrical interface between the heating element 24, 124 and an electrical comfort control system (described below).

As shown in FIGS. 1, 4, 7, and 8, the modular comfort assembly 20 may include a lumbar support system 52, 152 adapted for placement on a surface 40, 140 of the diffuser 22, 122 opposing the diffuser surface 34, 134 upon which the heating element 24, 124 is placed. The lumbar support system 52, 152 may include internal baffles 54 (shown in FIG. 8) that are disposed within the lumbar support system for added structural support. An air pump 56, 156 may be connected to an air inlet 58, 158 of the lumbar support system 52, 152 to allow for inflation and deflation of the lumbar support system.

Further, the modular comfort assembly 20, 120 may also include an air moving device 60, 160 in communication with the diffuser 22, 122 for circulating air through the diffuser 22, 122 to provide a convection cooling effect. The air moving device 60, 160 may be a fan, blower or similar.

During operation of the modular comfort assembly 20, 120, air flows through the through holes 19, 119 in the foam bun 14, 114, is evenly distributed through the ventilation diffuser 22, 122, and passes through the permeable material of the heating element 24, 124. The air moving device 60, 160 further allows for circulation of air through the diffuser 22, 122 to provide a convection cooling effect. The diffuser 22, 122 provides convection cooling to the occupant support environment, while the heating element 24, 124 simultaneously heats the occupant support environment. Also, inflation and deflation of the lumbar support system 52, 152 via the air pump 56, 156 allows for adjustment of the firmness of the occupant support 10, 110.

Figure 9:
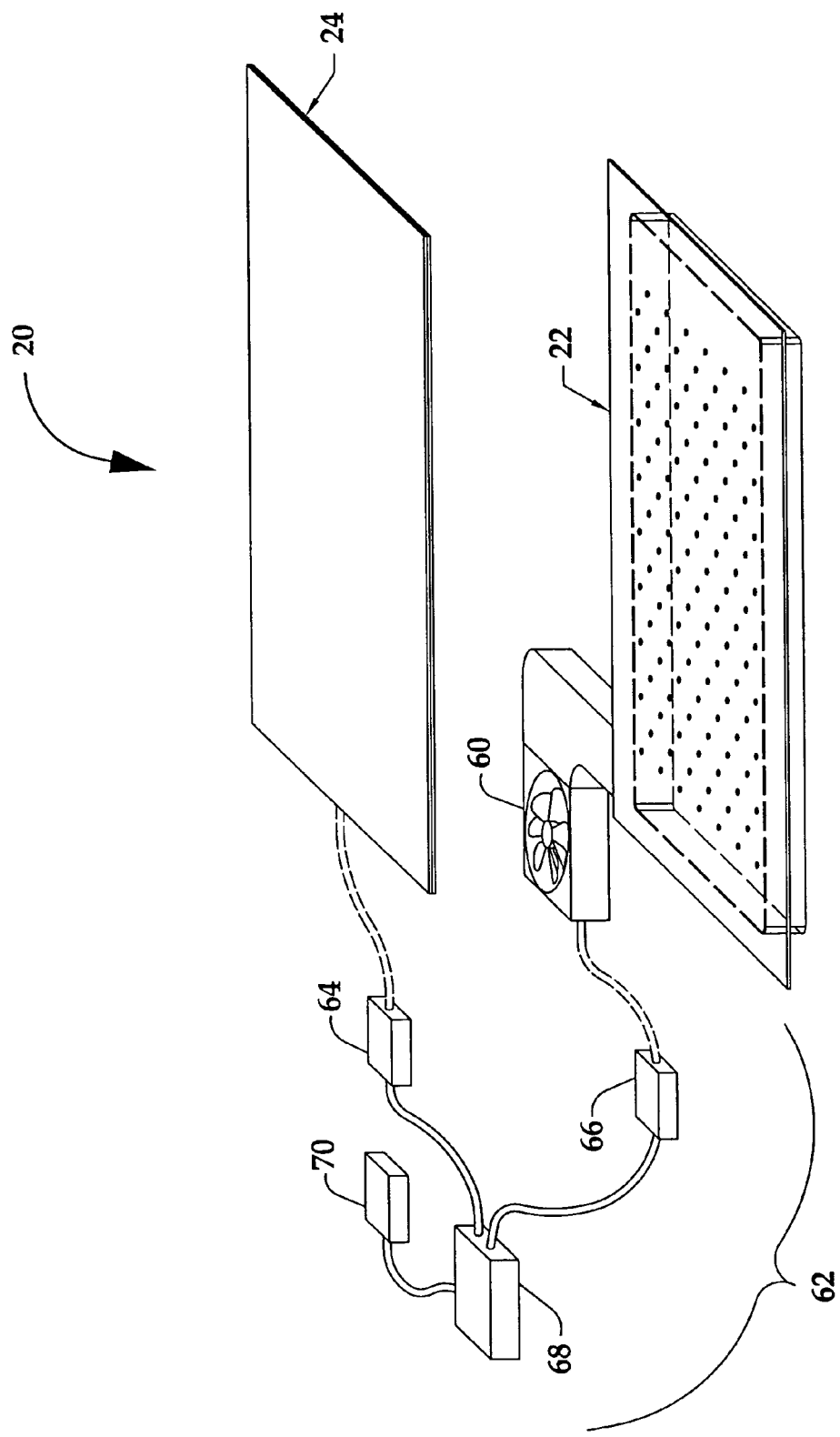
FIG. 9 is a schematic diagram of a comfort control system of the modular comfort assembly in accordance with the present invention.

Referring now to FIG. 9, the modular comfort assembly 20 may also include a comfort control system 62. The embodiments of the modular comfort assembly 120, 220 may similarly include a comfort control system, but for purposes of simplicity the comfort control system will only be described with reference to the first embodiment 20. The control system 62 includes a heat sensor 64 for sensing temperature indicative of heat output from the heating element 24. The system 62 also includes a cooling sensor 66 for sensing temperature indicative of convection cooling output from the air moving device 60. A processor 68 of the comfort control system 62 receives heat sensor and cooling sensor signals from the heat sensor 64 and cooling sensor 66 respectively. The processor 68 simultaneously controls the heating element 24 and air moving device 60 to provide a predetermined occupant support temperature within and around the occupant support. Additionally, the control system 62 may include an occupant support temperature sensor 70 for sensing the occupant support temperature and for providing additional feedback to the processor 68.

By receiving feedback from sensors 64, 66 and 70, and by simultaneously controlling the heating effect of heating element 24 and cooling effect of diffuser 22, the comfort control system 62 creates a comfortable occupant support environment temperature under various conditions. Additionally, the comfort control system 62 may have an optional burst mode for summer conditions and an optional burst mode for winter conditions.

In the summer condition air burst mode, an air burst will occur only when the environment temperature is over a predetermined temperature setting. In the summer condition air burst mode, only convection cooling from the diffuser 22 will be operative; the heating element 24 will not be activated. By initiating the comfort control system 62 through remote control, for example by unlocking the vehicle's doors, remotely starting the engine, or other similar action, the air moving device 60 will go to maximum speed and remain at this setting until the occupant support temperature sensor 70 reaches a preset value. Then the comfort control system 62 will gradually reduce the air flow from the air moving device 60, and resume a regular operation mode at a previously-set setting.

The system 62 can be programmed such that an additional air burst can only be activated after the vehicle is at a halt, or stopped for longer than a predetermined time, or the ignition is switched off to reset the system's air burst mode again. Moreover, the duration of the air burst mode can also be programmed with a timing device (not shown).

In the winter condition air burst mode, an air burst will occur only when the environment temperature is under a predetermined temperature setting. In the winter condition air burst mode, the heating element 24 will be activated in addition to the air moving device 60. As before, the comfort control system 62 may be activated through remote control. Once activated, both the heating element 24 and the air moving device 60 will go to maximum output and remain at this setting until the occupant support temperature sensor 70 rises to a preset value. Then the comfort control system 62 will gradually reduce the air flow from the air moving device 60 and heat output of the heating element 24, and resume a regular operation mode at a previously-set setting. The winter air burst mode can also be programmed for conditions of reactivation or for duration time as previously described with the summer air burst mode.

Alternatively, the comfort control system 62 may be set manually. In this mode of operation, an operator may select a desired speed/output at which the air mover 60 and heater 24 are ran simultaneously. This allows an operator additional freedom in operating the modular comfort assembly 20 and may be especially useful in creating a comfortable occupant support environment in convertible-top vehicles in "off-season" driving conditions.

Figure 10:
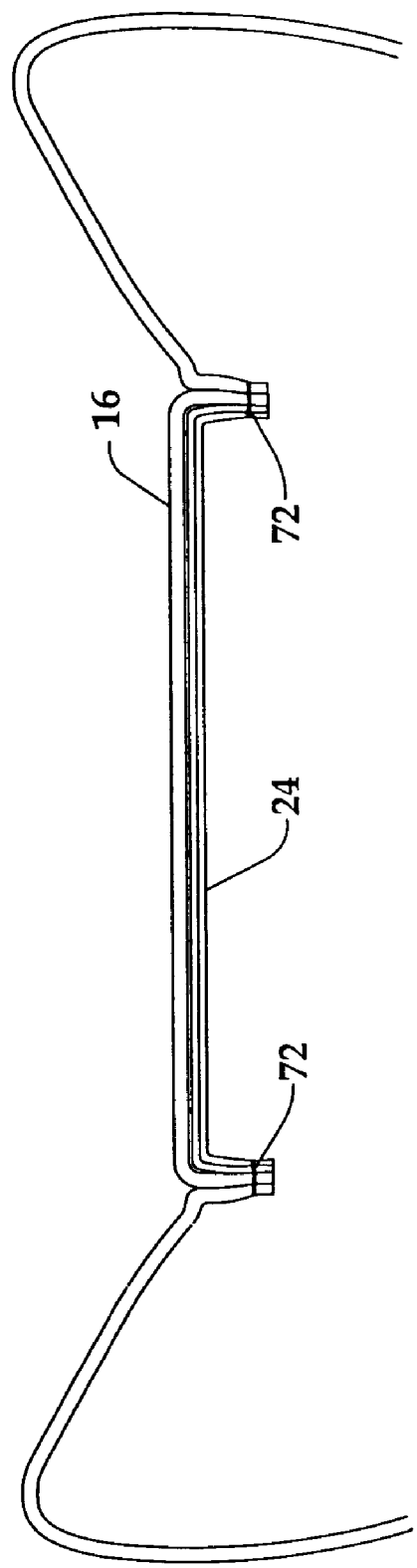
FIG. 10 is a side view of a heating element of the modular comfort assembly mounted to a fabric cover of the occupant support.

A method of installing a modular comfort assembly 20 within an occupant support 10 including a foam bun 14 having a surface 17 including a recess 18 therein includes the steps of providing a ventilation diffuser 22 having an outer edge 30 sized to extend over and cover a perimeter 32 of the recess 18. The diffuser 22 is mounted onto the surface 17 of the foam bun 14 such that the diffuser 22 seals the perimeter 32 of the recess 18. A heating element 24 is mounted on a surface 34 of the diffuser 22. Alternatively, the heating element 24 may be mounted (e.g., sewn with thread 72) to an inside surface of the fabric cover 16 that covers the modular comfort assembly 20 and foam bun 14, as illustrated in FIG. 10.

Optionally, the method may include the steps of providing an air permeable spacer material 36 allowing for an even flow of air therethrough and disposing the spacer material 36 in the recess 18 between the foam bun 14 and the diffuser 22. The method may also include the steps of forming through holes 19 in the foam bun 14 such that the through holes 19 extend from the recess 18 to a surface 15 of the foam bun 14 opposite the recess 18. An air moving device 60 may be provided which is in communication with the diffuser 22 via the through holes 19 for circulating air through the diffuser 22 to provide a convection cooling effect. Furthermore, the method of installation may include mounting a modular comfort subassembly in the recess 18, wherein the modular comfort subassembly is a pre-assembled modular comfort assembly including some or all of the components described herein (see also below). The modular comfort assembly/sub-assembly may be installed during the manufacturing of a vehicle or may be installed in the occupant support as an aftermarket accessory.

Because the heating element 24 may be made of permeable material, it is simple to assemble the modular comfort assembly 20 since there is no need to align holes in the heating element 24 with holes in the diffuser 22 as in prior comfort assemblies. Further, due to the permeable construction of the heating element 24, air flow does not pass around or by the heating element, but actually passes through the heating element. This facilitates a better mix of the convectional cooling effect of the diffuser 22 and the heating effect of the heating element 24, thereby preventing a temperature shock when switching the modular comfort assembly on.

After installation of the modular comfort assembly 20 in the foam bun 14, the fabric cover 16 may be placed over the foam bun 14 and seating frame 12. The fabric cover 16 may be a leather, cloth, or similar material, and may include perforations to facilitate the flow of air therethrough. Optionally, prior to sealing the fabric cover 16, a layer of spacer material (not shown) may be disposed between the modular comfort assembly 20 and the fabric cover 16. Alternatively, the spacer material (not shown) may be sewn to an inside surface of the fabric cover 16. When enclosed within the occupant support 10, the diffuser 22 adapts to the perimeter 32 of the recess 18 such that the outline of the modular comfort assembly 20 is not visible on the fabric cover 16. In other words, the modular comfort assembly 20 does not protrude from the recess 18 such that the modular comfort assembly does not noticeably raise the surface of the fabric cover 16.

Alternatively, a method of installing a modular comfort assembly 120 includes the steps of providing a three-dimensional diffuser bag 122 including a top perforated surface 134 having a non-perforated portion 128 adapted to extend over the perimeter 132 of the recess 118, a bottom surface 140 adapted to lay in the recess 118, and a sidewall 142 extending between the top 134 and bottom 140 surfaces. An air permeable spacer material 136 is disposed within the diffuser bag 122. The three-dimensional diffuser bag 122 is mounted in the recess 118. Optionally, the method may also include the step of placing a lumbar support system 152 on a surface 140 of the diffuser 122 opposing the diffuser surface 134 upon which the heating element 124 is placed.

Figure 11:
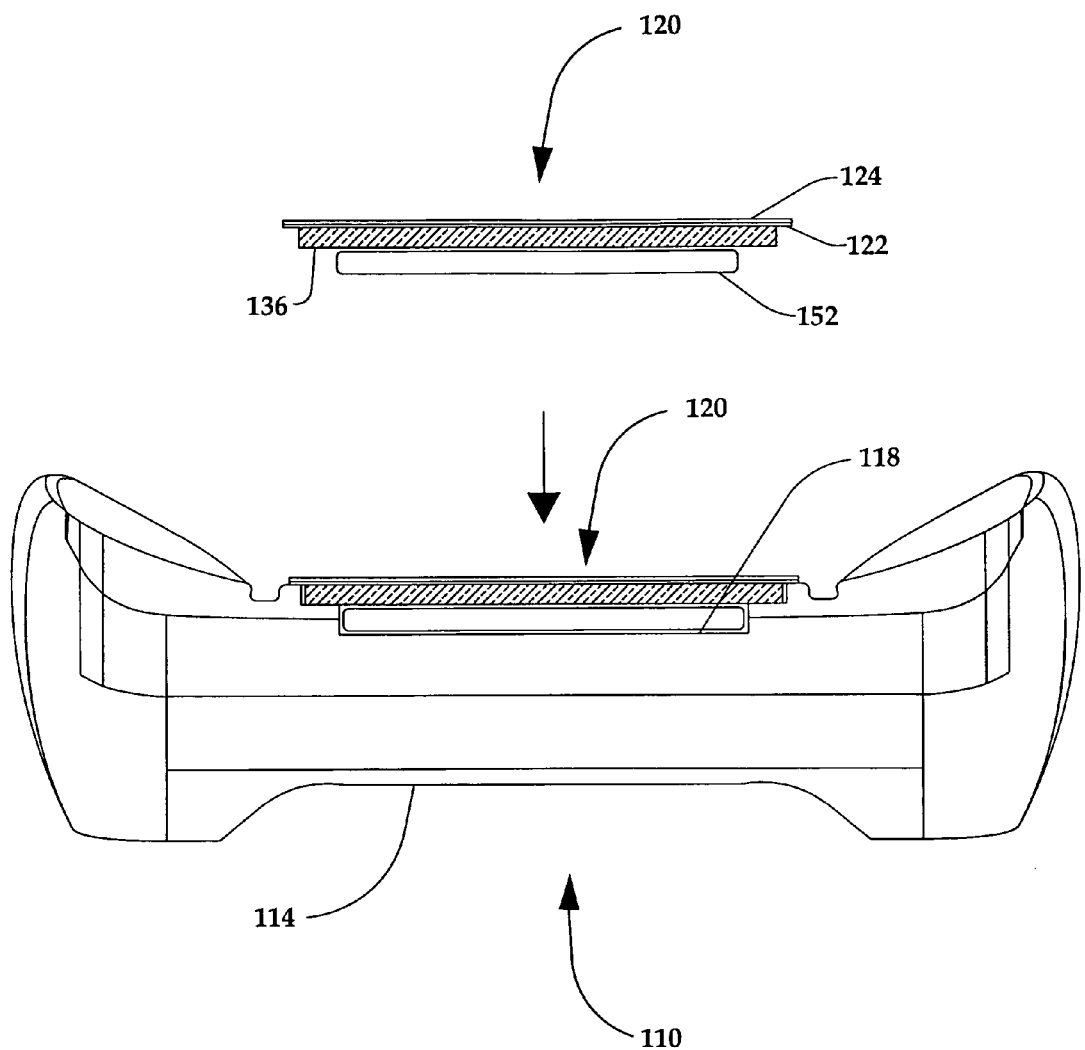
FIG. 11 is a schematic diagram illustrating installation of a modular comfort assembly as a modular unit into an occupant support.

Furthermore, as illustrated in FIG. 11, the method of installation may include mounting a modular comfort sub-assembly in the recess 118, wherein the modular comfort sub-assembly is a pre-assembled modular comfort assembly 120 including some or all of the components described herein. The modular comfort assembly/sub-assembly may be installed during the manufacturing of a vehicle or may be installed in the occupant support as an aftermarket accessory.

Figure 12:
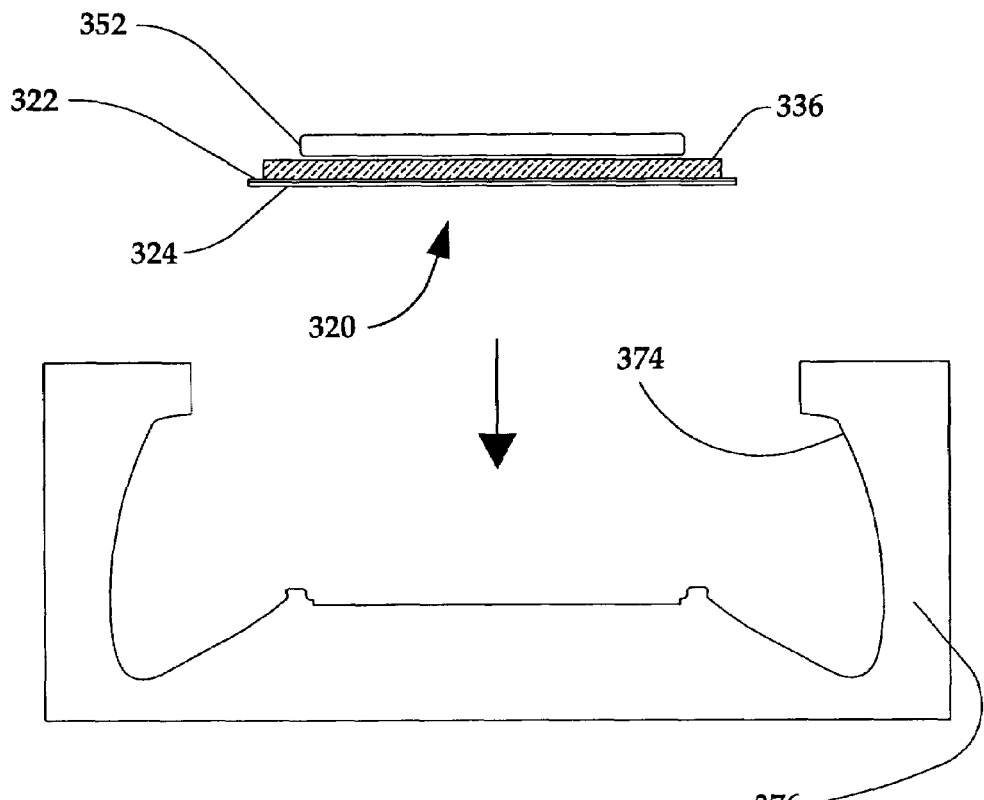
FIG. 12 is a schematic elevational sectional view illustrating a foam-in-place method of embedding a modular comfort sub-assembly in a foam bun.
Figure 13:
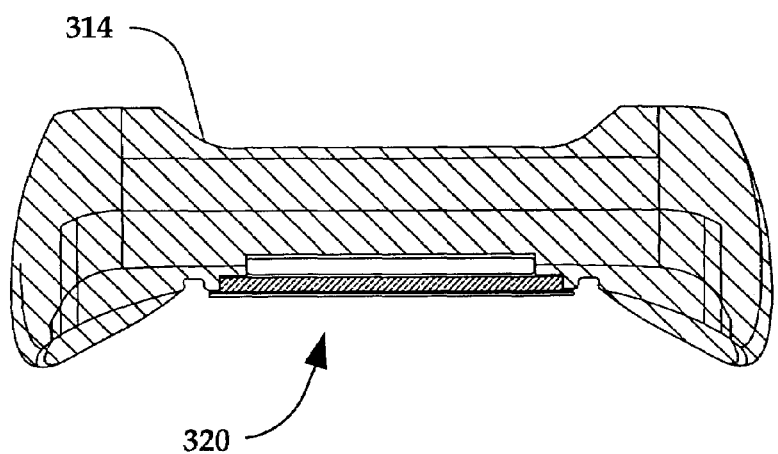
FIG. 13 is a schematic sectional view of a foam bun with integral modular comfort sub-assembly foam-in-place molded therein.

FIGS. 12 and 13 illustrate yet another embodiment of installing a modular comfort sub-assembly 320, in any of the various embodiments hereinabove described, into an occupant support. Specifically, the selected modular comfort sub-assembly 320 is placed within a molding cavity 374 of a mold 376, the cavity is closed, and foam is injected into the cavity to form the foam bun 314 around the sub-assembly in a foam-in-place operation. The mold 376 is then opened and the foam bun 314 with the sub-assembly 320 integral therewith is removable from the mold.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A modular comfort assembly adapted for installation within an occupant support having a surface including a recess therein having a periphery, the comfort assembly comprising:
    a three-dimensional diffuser bag containing an air permeable spacer material allowing for an even flow of air therethrough and adapted to be disposed in said recess and to substantially fill the recess and extend to the periphery thereof, the diffuser bag including:
        a bottom surface adapted to lay in said recess;
        a sidewall extending upward from a periphery of said bottom surface; and
        a top surface formed by a ventilation diffuser having a perforated inner portion lying against and being generally co-extensive with the spacer material, allowing for flow of air therethrough, said diffuser having a non-perforated outer edge portion extending beyond the inner portion and adapted to extend over and cover a portion of the occupant support outwardly adjacent the periphery of the recess, said sidewall engaging said top surface intermediate said perforated inner portion and said non-perforated outer edge portion, and said outer edge portion of said top surface extending outward beyond said sidewall; and
    a heating element disposed on a surface of the diffuser.

2. The modular comfort assembly of claim 1 wherein said ventilation diffuser comprises a sheet including a plurality of spaced apertures surrounded by said non-perforated outer edge portion.

3. The modular comfort assembly of claim 1 wherein the diffuser bag bottom surface includes perforations allowing for air flow through the bottom of the diffuser.

4. The modular comfort assembly of claim 1 wherein the heating element comprises:
    a layer of permeable material adapted for placement on a surface of the diffuser; and
    a heating wire formed in a predetermined pattern disposed about the layer of permeable material.

5. The modular comfort assembly of claim 1 comprising:
    a lumbar support system adapted for placement on a surface of the diffuser opposing the diffuser surface upon which the heating element is placed.

6. The modular comfort assembly of claim 5 wherein said lumbar support system comprises internal baffles.

7. The modular comfort assembly of claim 5 comprising:
    an air pump connected to an air inlet of said lumbar support system to allow for inflation and deflation of said lumbar support system.

8. The modular comfort assembly of claim 1 comprising:
    an air moving device in communication with said diffuser for circulating air through said diffuser to provide a convection cooling effect.

9. The modular comfort assembly of claim 8 comprising:
    a control system including:
        a heat sensor for sensing temperature indicative of heat output from said heating element;
        a cooling sensor for sensing temperature indicative of convection cooling output from said air moving device; and
        a processor for receiving heat sensor and cooling sensor signals, the processor simultaneously controlling the heating element and air moving device to provide a predetermined occupant support temperature within the occupant support.

10. The modular comfort assembly of claim 9 wherein the control system comprises:
    an occupant support temperature sensor for sensing the occupant support temperature.

* * * * *